(12) United States Patent  (10) Patent No.: US 7,515,093 B2
Humphrey  (45) Date of Patent: Apr. 7, 2009

(54) ACTIVE ANTENNA RADAR SYSTEM

(75) Inventor: Denver Humphrey, Ballymena (GB)

(73) Assignee: TDK Corporation, Tokyo (JP)

( * ) Notice: Subject to any disclaimer, the term of this patent is extended or adjusted under 35 U.S.C. 154(b) by 717 days.

(21) Appl. No.: 11/088,178

(22) Filed: Mar. 24, 2005

(65) Prior Publication Data

US 2006/0214838 A1 Sep. 28, 2006

(51) Int. Cl.
G01S 13/56 (2006.01)
(52) U.S. Cl. .................. 342/70; 342/132; 342/134; 342/175
(58) Field of Classification Search ............. 342/70–72, 342/132, 134, 175
See application file for complete search history.

(56) References Cited

U.S. PATENT DOCUMENTS 4,315,260 A * 2/1982 Kupfer .................. 342/86
7,391,361 B2 * 6/2008 Kishida ................. 342/109
2006/0097906 A1 * 5/2006 Heide ................... 342/22
2006/0214838 A1 * 9/2006 Humphrey ............. 342/70

FOREIGN PATENT DOCUMENTS

GB 2158669 A * 11/1985

* cited by examiner

Primary Examiner—John B Sotomayor
(74) Attorney, Agent, or Firm—Oliff & Berridge, PLC

(57) ABSTRACT

A radar system comprising a transmit antenna, a receive antenna and a mixer for combining a signal received by said receive antenna with a reference signal to produce an output signal. The transmit antenna includes an active antenna oscillator, the reference signal being derived from the active antenna oscillator. The active antenna oscillator is turned on and off by a pulse modulated biasing signal to produce a pulse modulated RF signal. The reference signal is delayed before being supplied to the mixer, the output of the mixer being used to determine when a detected object is a pre-determined distance from the system.

13 Claims, 4 Drawing Sheets

ACTIVE ANTENNA RADAR SYSTEM

FIELD OF THE INVENTION

The invention relates to systems, especially radar systems, for detecting objects using electromagnetic waves. In particular, the invention relates to an obstacle detection system for a vehicle.

BACKGROUND TO THE INVENTION

Radar systems typically include means for transmitting an electromagnetic wave from and means for receiving a reflected signal produced when the transmitted signal is reflected by any object present in the direction of transmission. Where such systems are used in vehicles, the transmitted signal is transmitted from a vehicle, for example in the direction of travel of the vehicle, so that obstacles may be detected.

A basic pulsed radar system is shown is shown in FIG. 1, generally indicated as 10. An RF (Radio Frequency) signal from a local oscillator (LO) 12 is modulated by a pulse signal at modulation unit 14. This results in small bursts of Electromagnetic (EM) radiation at the pulse repetition frequency. The frequency spectrum produced by these bursts comprises frequency components above and below the LO frequency, at least some of the frequency components being offset from one another by an amount equal to the pulse repetition frequency. Within a given bandwidth, there can be a relatively large number of frequency components if a sharp or narrow pulse is used at modulation unit 14, or a relatively small number of frequency components if a wider or longer pulse is used. The pulse modulated EM signal is transmitted from the system 10 by a transmit (TX) antenna 15, usually after having been gain adjusted by a gain amplifier 16.

When the transmitted signal is reflected back to the system 10 by a object (not shown) in the path of the transmitted signal, the reflected signal is received by a receive (RX) antenna 18, after which the received signal is usually gain adjusted by a gain amplifier 20. The received signal is provided to a mixer component 22 whereupon the LO signal is de-modulated from the pulse signal. When the de-modulated pulse signal is inspected in the time domain (e.g. by display on a CRO) it may be observed that the de-modulated pulse signal is time delayed with respect to the pulse signal at the transmit side of the system 10. The time delay corresponds to the distance travelled by the transmitted signal before it was received at the RX antenna 18, and so the distance to the object can be determined.

The example system 10 shown in FIG. 1 includes only a single channel. To help distinguish objects more clearly, complex, or IQ, de-modulation is often used wherein there are two channels, usually referred to as I and Q, the I and Q channels being in quadrature with one another. The main principle of operation in each channel is generally the same as that described with reference to FIG. 1.

An alternative system employing a pulsed radar technique is shown in FIG. 2, generally indicated as 110. In system 110, a variable delay unit 130 is used to determine the transit time of the transmitted and reflected signal, and thus the distance to the object. In a manner similar to that of the system of FIG. 1, the signal transmitted from the transmit antenna 115 comprises a carrier signal (generated by oscillator 112) modulated by a pulse signal. The pulse signal is conveniently created using a pulse repetition frequency (PRF) generator 113 and a pulse former 111 in conventional manner. A mixer unit 122 mixes the received signal (from antenna 118) with the pulse modulated carrier signal to produce an output signal 132. The time delay unit 130 may be used to adjust the position of the pulse signal in the time domain, i.e. to delay the pulse signal used to modulate the carrier signal at the receive side of the system 110. The delay is adjusted until the output signal 132 takes a pre-determined form—this indicates that the delay has been set correctly and the set delay may be used to determine the distance travelled by the transmitted and reflected signal.

Conventional radar systems can be quite cumbersome and elaborate as they have numerous components and various different topologies. In addition, each system requires an oscillator with a sizeable amount of output power for the transmit (TX) chain and to de-modulate the received (RX) signal.

It would be desirable, therefore, to provide a system that mitigates the problems outlined above.

SUMMARY OF THE INVENTION

A first object of the invention provides an object detection system comprising a transmit antenna, a receive antenna and means for processing a signal received by said receive antenna with a reference signal, wherein said transmit antenna comprises at least one active antenna oscillator, said reference signal being derived from said at least one active antenna oscillator.

In preferred embodiments, said at least one active antenna oscillator includes an antenna component, said reference signal being derived from a probe point associated with said antenna component such that said reference signal represents a transmit signal that emanates from said antenna component during use.

Conveniently, said antenna component is associated with a d.c. feed point, said d.c. feed point providing said probe point. More conveniently, said antenna component has an open circuit point, said d.c. feed point being provided at said open circuit point.

Typically, said system includes means for providing a biasing signal to said at least one active antenna oscillator, wherein said at least one active antenna oscillator transmits, or does not transmit, said transmit signal depending on the level of said biasing signal. Said biasing signal may comprise a pulse modulated d.c. signal.

Conveniently, the antenna component is associated with a d.c. feed point, said biasing signal being applied via said d.c. feed point. Said reference signal may be derived from said d.c. feed point.

In preferred embodiments, the system includes means for delaying said reference signal before said reference signal is supplied to said processing means. Advantageously, said delaying means is adjustable to provide an adjustable delay.

The processing means typically comprises a signal mixer.

The system may include at least two active antenna oscillators, means for supplying a respective biasing signal said at least two active antenna oscillators, and means for causing the level of at least one of said biasing signals to differ from the level of the or each other biasing signal.

In some embodiments, the system includes at least two mutually coupled active antenna oscillators.

A second aspect of the invention provides a radar system comprising a transmit antenna, a receive antenna and means for processing a signal received by said receive antenna with a reference signal, wherein said transmit antenna comprises at least one active antenna oscillator, said reference signal being derived from said at least one active antenna oscillator.

In a preferred embodiment, the radar system comprises a transmit antenna, a receive antenna and a mixer for combining a signal received by said receive antenna with a reference signal to produce an output signal. The transmit antenna includes an active antenna oscillator, the reference signal being derived from the active antenna oscillator. The active antenna oscillator is turned on and off by a pulse modulated biasing signal to produce a pulse modulated RF signal. The reference signal is delayed before being supplied to the mixer, the output of the mixer being used to determine when a detected object is a pre-determined distance from the system. Advantageously, the delay is adjustable.

A third aspect of the invention provides a method of detecting an object in an object detection system comprising a transmit antenna, a receive antenna and means for processing a signal received by said receive antenna with a reference signal to produce an output signal, wherein said transmit antenna comprises at least one active antenna oscillator, the method including deriving said reference signal from said at least one active antenna oscillator; delaying said reference signal before said reference signal is supplied to said processing means; determining that a detected object is a predetermined distance from the system depending on the output signal.

Advantageously, the method further includes adjusting the delay of the reference signal and determining the distance of the detected object by the value of the delay.

A fourth aspect of the invention provides a radar system comprising at least one active antenna oscillator.

The invention is particularly suited for use in a vehicle's, especially a car's, short range radar system, or any other short range radar system or pulsed radar system.

Further aspects of the invention will become apparent to those ordinarily skilled in the art upon review of the following description of specific embodiments and with reference to the accompanying drawings.

BRIEF DESCRIPTION OF THE DRAWINGS

Specific embodiments of the invention are now described by way of example and with reference to the accompanying drawings in which.

DETAILED DESCRIPTION OF THE DRAWINGS

Figure 3:
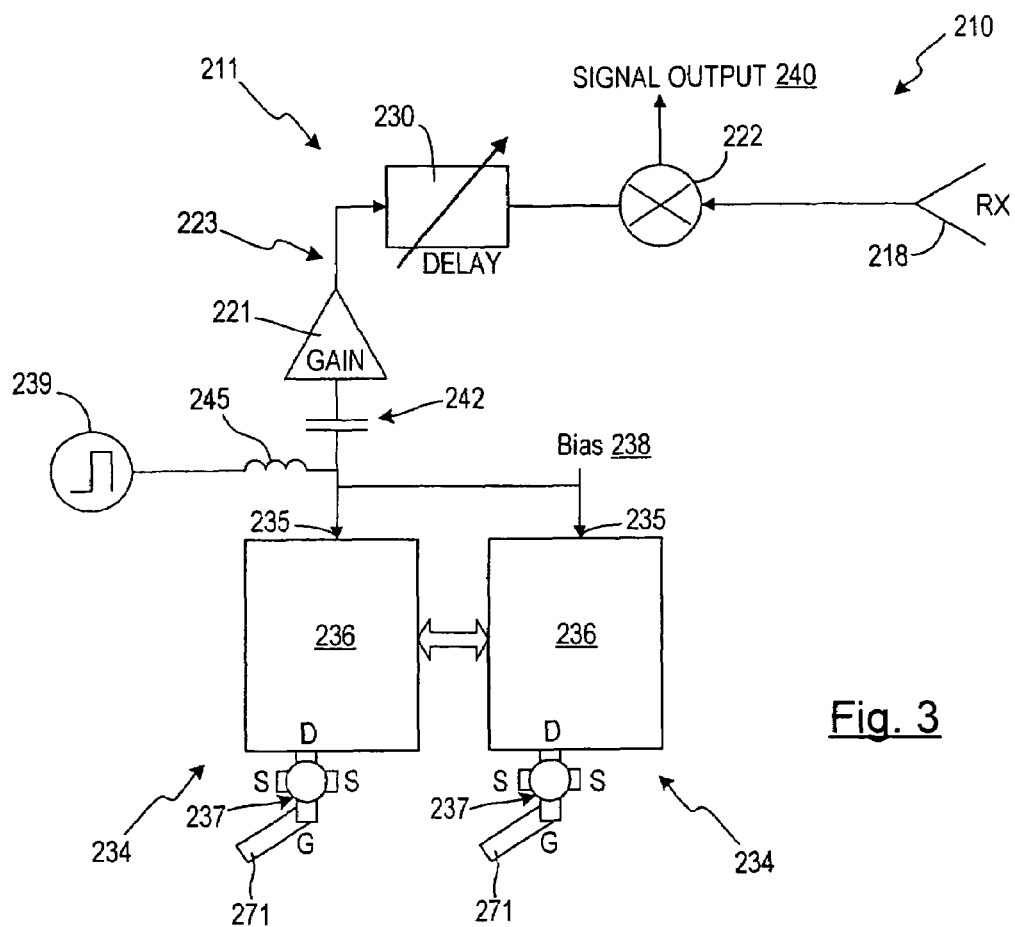
FIG. 3 shows a schematic diagram of a radar system embodying one aspect of the present invention.

FIG. 3 shows a radar system, generally indicated at 210, embodying one aspect of the invention. The system 210 includes two active antenna oscillators 234 which, during use, transmit RF signals, and in particular pulse modulated RF signals. In use, the system 210 detects objects in the path of the transmitted RF signal and, more particularly, determines the distance of the detected object from the system 210. Each antenna oscillator 234 comprises an antenna component or antenna 236, for example in the form of a patch antenna, e.g. a microstrip patch antenna, and an active component in the form of a transistor 237. The antenna component 236 may take other conventional antenna forms.

Figure 4:
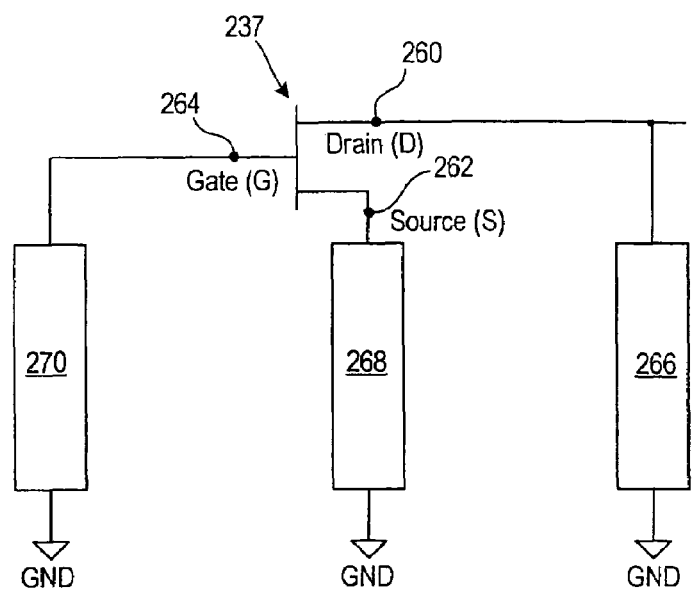
FIG. 4 shows a schematic diagram of an active antenna oscillator.

FIG. 4 shows a circuit diagram of a suitable active antenna oscillator 234. The oscillator 234 includes a transistor 237, for example in the form of a FET, having drain, source and gate terminations 260, 262, 264. Each termination is associated with a respective load 266, 268, 270. The antenna 236 serves as the load 266 for the drain termination 260 with respect to ground as shown. The load 268 for the source termination 262 typically comprises a capacitance (not shown) arranged with respect to ground as shown. The load 270 for the gate termination 264 is typically comprises an inductance and is usually provided by a length of transmission line (shown as 271 in FIG. 3). Depending on the respective impedance values of the loads 266, 268, 270 and on how the transistor 237 is biased (typically determined by the drain-source voltage ($V_{DS}$) and the gate-source voltage ($V_{GS}$)) the circuit of FIG. 4 is caused to oscillate. As a result, the voltage level at the drain termination oscillates and this causes the antenna 236 to radiate or transmit a signal at the oscillation frequency. Conventional techniques and equations exist for determining each of the impedance values in order to create oscillation. The antenna component 236, which in this example comprises a microstrip patch, is defined, or designed, to fulfil the value of the drain impedance 266 and to radiate signals at the oscillation frequency. Thus the antenna 236 becomes part of the oscillator 234. Movement of the antenna 236 away from the oscillator 234 will stop an oscillation from forming in the system. The antenna 236 ground plane is not shown but is represented in FIG. 4 as a ground termination on load 266.

The oscillation frequency is typically determined by selection of the length of the transmission line 271 providing the gate impedance 270. In the present example, the oscillation frequency is in the RF frequency range.

In the illustrated embodiment, the active antenna oscillators 234 are configured so that when a dc (direct current) bias signal 238 is applied to the respective antenna 236 at a respective antenna feed point 235, the active antenna oscillators 234 generate an RF signal (depending on the level of the d.c. bias signal or, more specifically, on $V_{DS}$ or $V_{GS}$) at the oscillation frequency. The RF signal serves as a carrier signal that may be modulated, as is described in more detail below, and transmitted from the system 210. The respective d.c. feed point 235 is conveniently located (electrically) at the respective drain termination 260 and so variations in the d.c. bias signal 238 causes variations in $V_{DS}$ of the respective transistor 237. Preferably, the respective d.c. feed point 235 is located (electrically) at the open circuit position to the oscillation frequency of the respective antenna 236. The d.c. feed point 235 may be provided in any suitable form, including a direct feed to the resonating structure of the antenna 236 or an indirect feed. As indicated above, the respective antenna 236 serves as a load impedance for the respective oscillator 234 and generates an RF carrier signal when the respective oscillator 234 oscillates. The preferred arrangement is such that there is a relatively high power transfer (i.e. relatively low power loss) between the antenna 236 and the rest of the oscillator 234.

In the example system 210, the active antenna oscillators 234 are mutually coupled, during use, by means of mutual injection locking. Hence, the antenna oscillators 234, during use, lock to a combined frequency, with a combined, or cumulative, output power. In alternative embodiments, the system 210 may comprise only a single active antenna oscillator 234, or may have more than two active antenna oscillators 234, and the d.c. bias level may be adjusted until the required EIRP (Effective Isotropically Radiated Power) level is obtained.

The system 210 includes means for generating a pulse signal, for example a signal comprising a train of pulses, typically square or rectangular pulses and normally at a constant frequency. In FIG. 3, the pulse signal generating means is shown as pulse generator 239 and may take any suitable form, for example a PRF generator and pulse former. The pulse signal is used to modulate the RF carrier signal produced by the active antenna oscillators 234. In the illustrated embodiment, this is achieved by applying the pulse signal to the d.c. feed point 235 of the active antenna oscillators 234 so that the RF carrier signal is modulated in accordance with the pulse repetition frequency, i.e. the pulse signal provides the dc bias signal 238 for the or each active antenna 234. The pulse modulation causes the d.c. bias level of the active antennas 234 to vary between a first level at which the oscillators 234 are off and so the carrier signal is not generated, and a second level at which the oscillators 234 are on and so generate the carrier signal. Hence, the transmission of the carrier signal from the antennas 234 is modulated by the pulse signal. In general, the pulse signal is applied to the, or each, active antenna oscillator 234 so as to vary the d.c. bias of the respective oscillator 234, and more particularly of the respective transistor 237, such that the RF carrier signal is turned on and off in accordance with the pulse frequency. In the illustrated embodiment, this is achieved by using the pulse signal to vary $V_{DS}$ of the respective transistors 237, although it may alternatively be achieved in any other convenient manner. For example, the pulse signal may be applied to the respective gate termination 264 of each transistor 237 thereby varying $V_{GS}$. In such a case, the respective drain termination 260 is held at a constant voltage, for example, the system supply voltage, conveniently by means of the d.c. feed input 235.

The system 210 includes a receive (RX) antenna 218 for receiving signals, especially signals that have been transmitted from the active antenna oscillator 234 and reflected off an object (not shown) back to the system 210. In order to provide a reference signal against which received signals can be compared, or otherwise processed, a probe point is established at least one of the active antenna oscillators 234, from which probe point a signal may be obtained that comprises, represents, corresponds to, or is indicative of, the modulated RF signal that emanates from the active antenna oscillators 234 during use. The probe signal may be obtained from any suitable point, conveniently from one or more of the respective antennas 236. The probe point may be directly connected to or indirectly coupled to the respective antenna 236. For example, the probe point may be provided on the resonating structure or patch of the antenna 236 itself, or may be coupled thereto. In the illustrated embodiment, the probe signal is taken from the d.c. feed point 235, as is described in more detail below.

It is observed that, during use, a relatively small RF signal, which may be referred to as a leakage signal, is present at the dc feed point 235 of the respective antennas 236 of the, or each, active antenna oscillator 234. The leakage signal corresponds to the modulated RF carrier signal that emanates from the antennas 236 during use. Hence, the leakage signal may conveniently be used as the probe or reference signal. In the illustrated embodiment where there are two mutually coupled active antenna oscillators 234, the respective leakage signal from each antenna 236 is the same.

The system 210 also includes means for combining or comparing or otherwise processing signals received at the RX antenna 218 with the reference signal to produce an output signal 240. In the preferred embodiment, the system 210 includes a mixing unit 222 for this purpose. The system 210 also includes a circuit path 223 for carrying the reference signal from the probe point, which in this example is the d.c. feed point 235, to the mixer 222, or other processing means. During use, the mixer 222 mixes or compares the received reflected signal with the reference signal (which in this example comprises the leakage signal or a derivative thereof) to produce output signal 240. In embodiments where more than one active antenna oscillator 234 are present, the reference signal may only be taken from one of the active antenna oscillators 234.

The system 210 further includes means for delaying the reference signal, advantageously by a variable amount. To this end, the preferred system 210 includes a variable time delay line or element 230 in circuit path 223 which may take any suitable conventional form. By way of example, the paper by R. Mende, A. Zander, entitled "A Multifunctional Automotive Short Range Radar System," German Radar Symposium (GRS), Berlin, October 2000, discloses a variable time delay element. The arrangement is such that, before being processed with the received signal, the leakage or reference signal is time delayed by an amount depending on the time delay unit 230.

Because the leakage signal is usually relatively small, it is preferred to amplify the leakage signal before processing it with the received signal. Hence, an amplifier 221, or other gain element, may be provided in circuit path 223.

Advantageously, a dc blocking capacitor 242 is provided in circuit path 223, preferably adjacent the dc feed point 235, or other probe point, in order to prevent any d.c. bias signal from following circuit path 223. In the illustrated embodiment, an RF choke in the form of an inductor 245 is provided between the d.c. feed point 235 and the pulse generator 239 in order to prevent the leakage signal from interfering with the generation of the pulse signal.

It will be seen that, in the illustrated embodiment, the reference signal is amplified and delayed before being fed into mixer 222 whereupon the reference signal is mixed with the received signal. If the delay caused by the delay unit 230 matches or corresponds with the delay incurred by the received signal in being transmitted from the system 210, reflected off an object and returned to the system 210, then the output signal 240 comprises one or more pre-determined identifiable characteristics—for example, in the preferred embodiment, the output signal 240 takes the form of a dc signal with substantially no RF components. However, should the delay caused by the delay unit 230 not correspond with the delay incurred by the received signal, then the output signal 240 does not exhibit said pre-determined characteristics—for example, the signal 240 may comprise a low frequency component. During use, the delay caused by the delay unit 230 may be adjusted until the desired output signal 240 is obtained, and the selected delay is thus indicative of the distance that the received signal has travelled and therefore of the distance of the reflecting object from the system 210.

Figure 5:
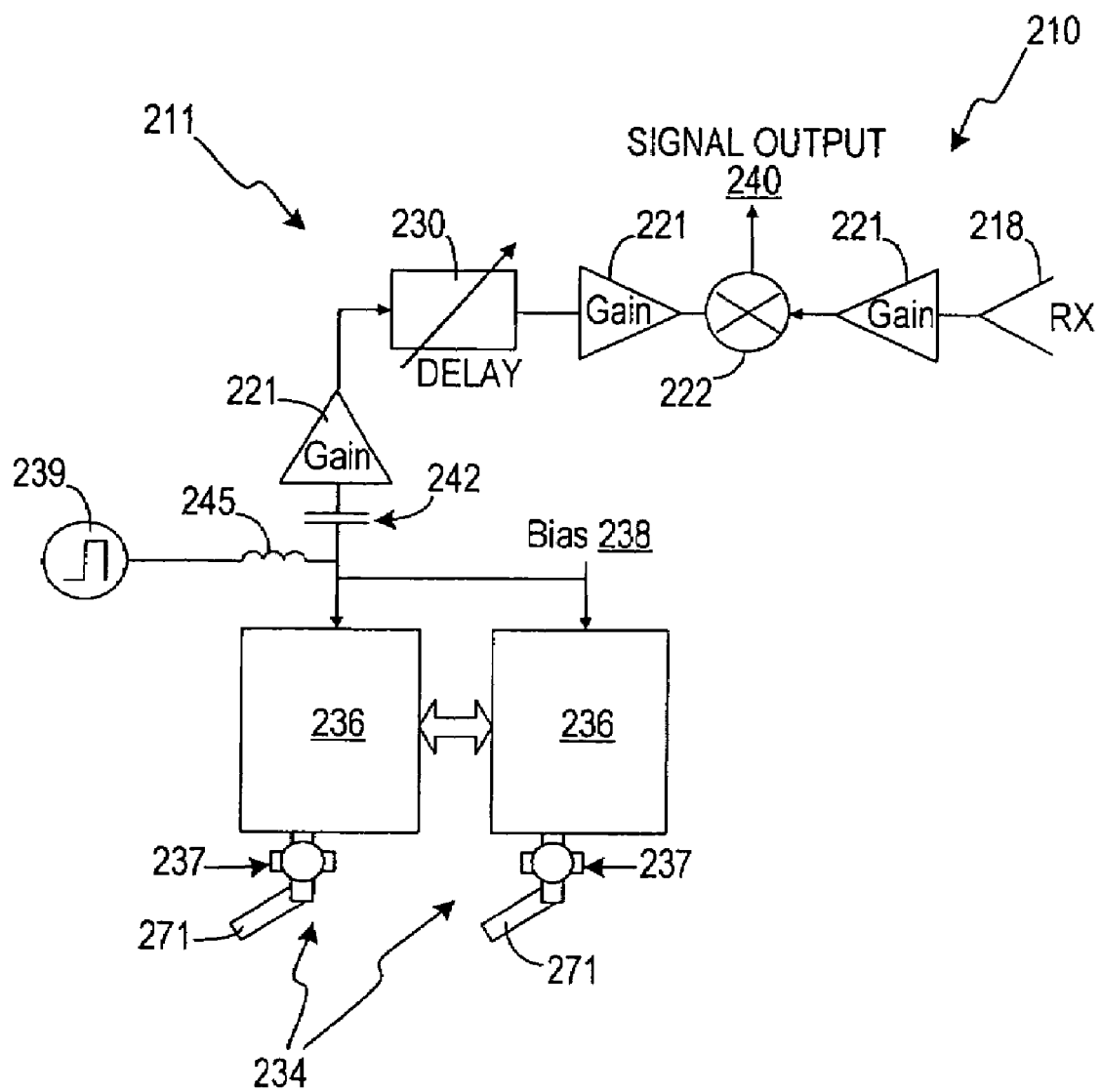
FIG. 5 shows a schematic diagram of an alternative system embodying the invention.

FIG. 5 illustrates alternative arrangements for the system 210. In particular, the amplifying means, or gain stage(s), in the receive side 211 of the system 210 may be provided in the circuit path 223 before and/or after the delay element 230 and/or between the RX antenna 218 and mixer 222.

Figure 6:
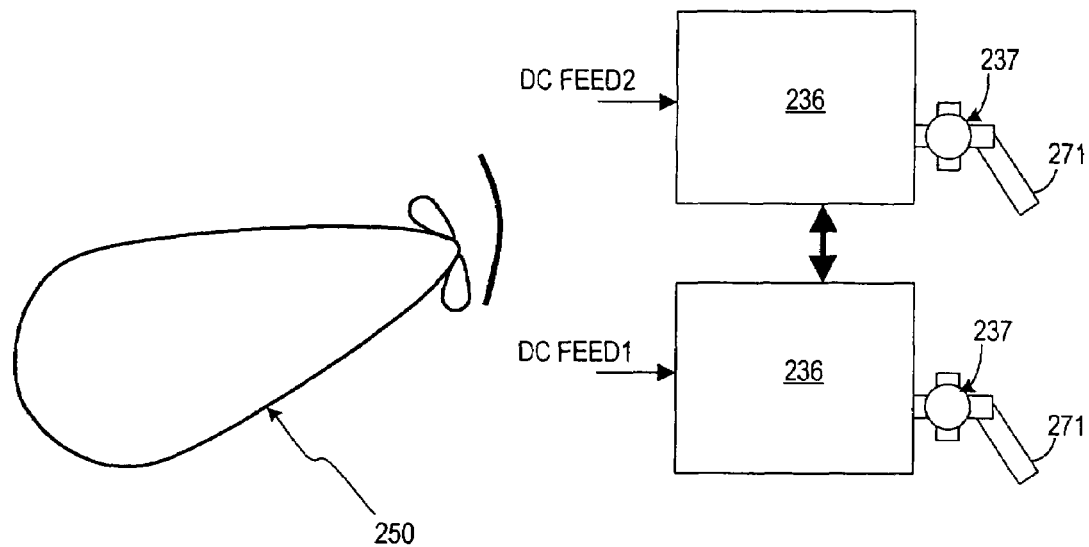
FIG. 6 shows active antennas and illustrates that the main antenna beam can be squinted.
Figure 6:
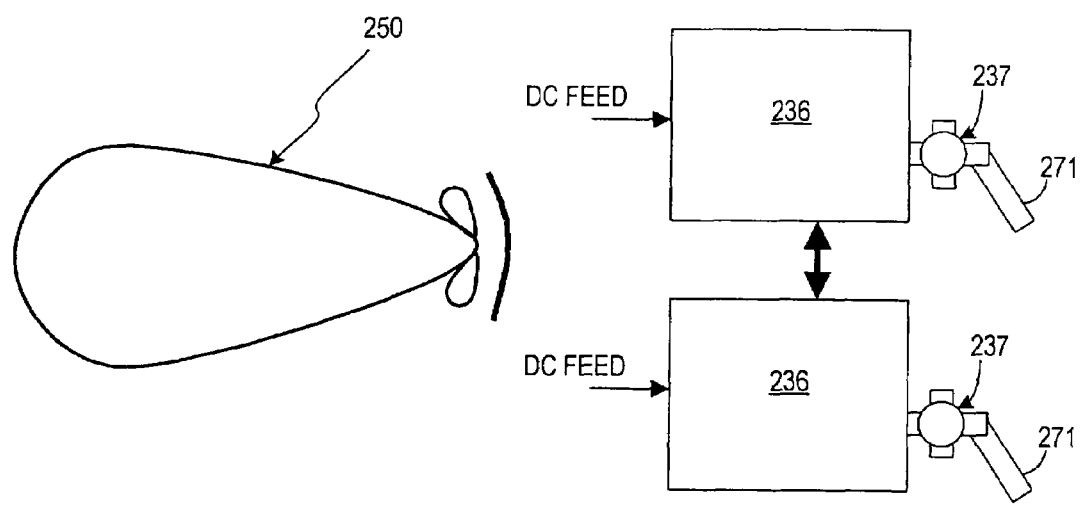

With reference to FIG. 6, the d.c. bias level on the, or each, of the active antenna oscillators 234 can be adjusted by attenuating or amplifying, i.e. adjusting the amplitude of, the pulse signal provided to each active antenna element 234. By causing the d.c. bias of one active antenna oscillator 234 to differ from the d.c. bias of the other antenna oscillator 234, the main lobe pattern 250 direction of the radiation produced by the active antennas 234 may be adjusted, or squinted, as illustrated in FIGS. 6A and 6B. This technique may be applied where there are at least two active antenna oscillators and can be useful in determining the target object direction and helps improve range detection limits. In the context of the example system 210 of FIG. 3, this may be achieved by, for example, providing a gain stage or attenuator (not shown) between the respective d.c. feed points 235 of the antennas 236. Advantageously, the gain stage or attenuator are associated with a switching circuit that allows them to be selectably included in, or omitted from, the circuit path between respective d.c. feed points. Alternatively, the level of the respective d.c. biasing signal for each active antenna oscillator 234 may be set independently of the other.

The leakage or reference signal from more than one active antenna element 234 may be used in circuit path 223. This allows a reduction of gain elements that may otherwise be required in the RX chain 211. In general, however, a reference signal need only be taken from one active antenna oscillator.

As indicated above, a plurality of mutually coupled active antenna oscillators can be used in the system 210. This allows the TX output power to be varied.

Systems embodying the invention are particularly suited for use in object detection systems, especially for use in vehicles. However, aspects of the present invention may be used in any application where a pulsed radar system is required.

Figure 1:
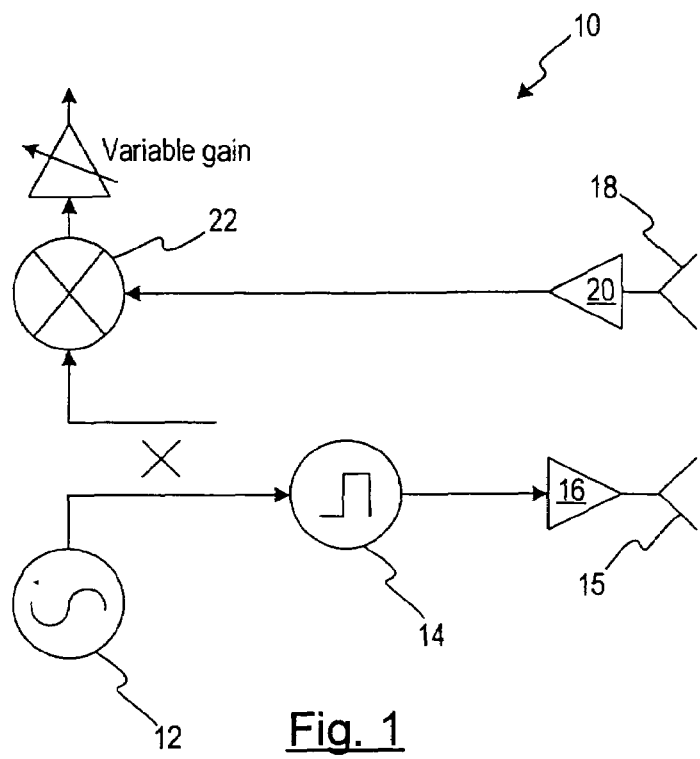
FIG. 1 shows a schematic diagram of a basic pulse radar system.
Figure 2:
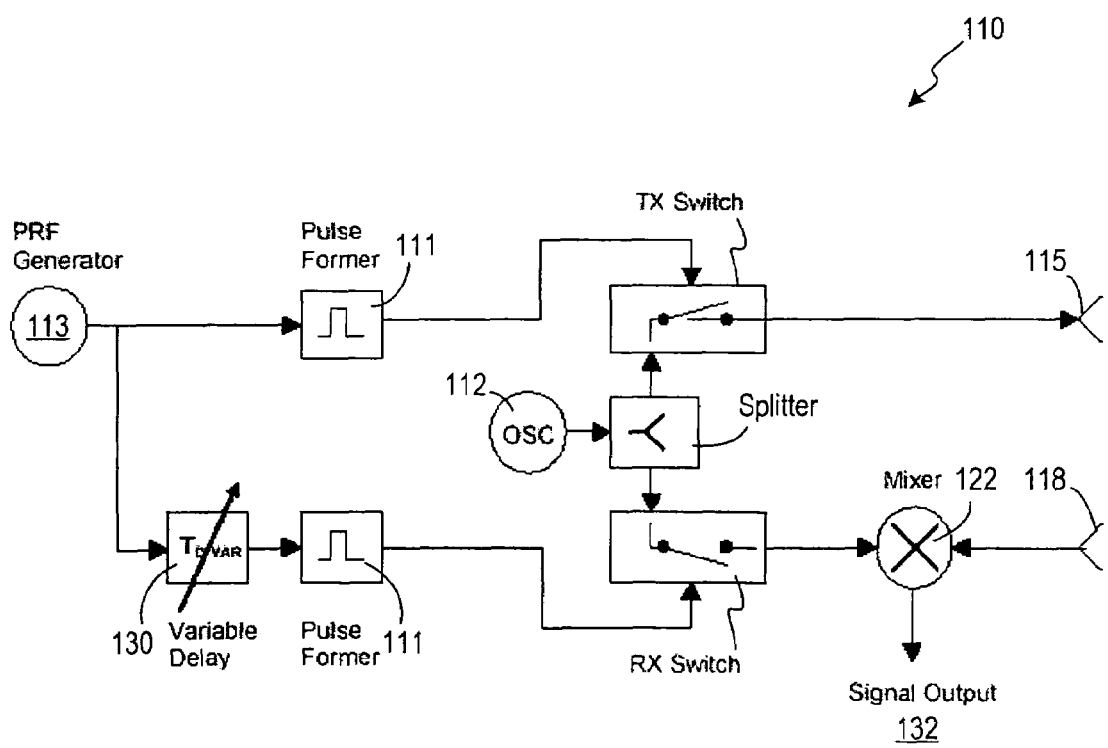
FIG. 2 shows a schematic diagram of an alternative pulse radar system.

It will be apparent from the foregoing that, in preferred systems embodying the invention, the local oscillator function is incorporated into an active antenna oscillator, and feedback circuit 223 is used to probe or sample the pulse frequency spectrum generated by the active antenna oscillator, i.e. to provide a reference signal from the TX active antenna. Object distance from the system 210 is determined using a delay method, advantageously a variable delay method, that is in principle similar to the method described with reference to FIG. 2. System 210 in its preferred form results in the following advantages over conventional systems: reduced transmission loss due to the removal of inter-element connecting components; reduced size and cost of the device or module (not shown) in which the system 210 is provided during use; and reduced complexity of the transmit antenna.

The invention is not limited to the embodiments described herein which may be modified or varied without departing from the scope of the invention.

The invention claimed is:

1. An object detection system comprising:
    a transmit antenna comprising at least one active antenna oscillator;
    a receive antenna;
    means for processing a signal received by the receive antenna with a reference signal; and
    means for providing a pulse modulated d.c. biasing signal to the at least one active antenna oscillator,
    the reference signal being derived from the at least one active antenna oscillator, and
    wherein the at least one active antenna oscillator transmits, or does not transmit, a transmit signal depending on the level of the pulse modulated d.c. biasing signal.

2. A system as claimed in claim 1, in which said at least one active antenna oscillator includes an antenna component, said reference signal being derived from a probe point associated with said antenna component such that said reference signal represents the transmit signal that emanates from said antenna component during use.

3. A system as claimed in claim 2, in which said antenna component is associated with a d.c. feed point, said d.c. feed point providing said probe point.

4. A system as claimed in claim 3, in which said antenna component has an open circuit point, said d.c. feed point being provided at said open circuit point.

5. A system as claimed in claim 1, in which said antenna component is associated with a d.c. feed point, the biasing signal being applied via the d.c. feed point.

6. A system as claimed in claim 5, wherein said reference signal is derived from said d.c. feed point.

7. A system as claimed in claim 1, including means for delaying said reference signal before said reference signal is supplied to said processing means.

8. A system as claimed in claim 7, wherein said delaying means is adjustable to provide an adjustable delay.

9. A system as claimed in claim 1, wherein said processing means comprises a signal mixer.

10. A system as claimed in claim 1, wherein said system includes:
    at least two active antenna oscillators;
    means for supplying a respective biasing signal to the at least two active antenna oscillators; and
    means for causing the level of at least one of said biasing signals to differ from the level of each other biasing signal.

11. A system as claimed in claim 1, wherein said system includes at least two mutually coupled active antenna oscillators.

12. A radar system comprising:
    a transmit antenna comprising at least one active antenna oscillator;
    a receive antenna;
    means for processing a signal received by the receive antenna with a reference signal, and
    means for providing a pulse modulated d.c. biasing signal to the at least one active antenna oscillator,
    the reference signal being derived from the at least one active antenna oscillator,
    wherein the at least one active antenna oscillator transmits, or does not transmit, a transmit signal depending on a level of the pulse modulated d.c. biasing signal.

13. An object detection system comprising:
    a transmit antenna comprising at least one active antenna oscillator, the at least one active antenna oscillator including an antenna component;
    a receive antenna;
    means for processing a signal received by the receive antenna with a reference signal; and
    means for providing a pulse modulated d.c. biasing signal to said at least one active antenna oscillator,
    the reference signal being derived from the at least one active antenna oscillator, the reference signal being derived from a probe point associated with the antenna component such that the reference signal represents a transmit signal that emanates from the antenna component during use, and wherein the antenna component is associated with a d.c. feed point, the d.c. feed point providing the probe point.

* * * * *